United States Patent
Richter et al.

(10) Patent No.: US 9,481,225 B2
(45) Date of Patent: Nov. 1, 2016

(54) MODULAR AIR CONDITIONING SYSTEM WITH HEAT PUMP FUNCTIONALITY

(75) Inventors: Gerald Richter, Aachen (DE); Marc Graaf, Krefeld (DE); Florian Wieschollek, Hurth (DE)

(73) Assignee: Hanon Systems, Daejeon-si (KR)

( * ) Notice: Subject to any disclaimer, the term of this patent is extended or adjusted under 35 U.S.C. 154(b) by 27 days.

(21) Appl. No.: 13/587,373

(22) Filed: Aug. 16, 2012

(65) Prior Publication Data

US 2013/0042637 A1 Feb. 21, 2013

(30) Foreign Application Priority Data

Aug. 16, 2011 (DE) .................. 10 2011 052 752

(51) Int. Cl.
| | |
|---|---|
| B60H 1/32 | (2006.01) |
| B60S 1/54 | (2006.01) |
| B60H 1/30 | (2006.01) |
| B60H 3/00 | (2006.01) |
| B60H 1/22 | (2006.01) |
| B60H 1/00 | (2006.01) |
| F24F 13/14 | (2006.01) |
| F25D 17/08 | (2006.01) |
| F24F 13/15 | (2006.01) |

(52) U.S. Cl.
CPC ...... *B60H 1/00514* (2013.01); *B60H 1/00057* (2013.01); *B60H 1/00899* (2013.01); *B60H 2001/00178* (2013.01); *F24F 13/142* (2013.01); *F24F 13/1413* (2013.01); *F24F 13/15* (2013.01); *F25D 17/08* (2013.01)

(58) Field of Classification Search
CPC .............. F25D 17/08; B60H 1/00057; B60H 1/00007; B60H 1/0005; B60H 2001/00085; B60H 1/00064; B60H 1/00692; B60H 1/00835; B60H 1/00035; B60H 1/00842; F24F 13/1413; F24F 13/142; F24F 13/15; F24F 13/04; F24F 13/14; F24F 13/1426; F16K 15/181; F16K 15/03; F16K 15/035; F16K 15/036; F16K 15/038
USPC ........... 62/407–410; 454/121, 126, 146, 156, 454/160; 137/513, 527
See application file for complete search history.

(56) References Cited

U.S. PATENT DOCUMENTS

| | | | | |
|---|---|---|---|---|
| 4,023,947 | A | * | 5/1977 | Ferry .............................. 62/180 |
| 5,222,372 | A | * | 6/1993 | DeRees et al. ................. 62/237 |
| 5,269,668 | A | * | 12/1993 | Lew ........................ F01C 1/352 |
| | | | | 418/234 |

(Continued)

FOREIGN PATENT DOCUMENTS

| | | |
|---|---|---|
| DE | 4244137 A1 | 7/1993 |
| DE | 69312854 T2 | 11/1997 |

(Continued)

*Primary Examiner* — Ryan J Walters
*Assistant Examiner* — Steve Tanenbaum
(74) *Attorney, Agent, or Firm* — Fraser Clemens Martin & Miller LLC; James D. Miller

(57) ABSTRACT

A modular vehicle air-conditioning unit for heating and cooling air includes a housing having at least one blower and a plurality of flaps for setting air flow paths and a refrigerant circuit in fluid communication with the housing. The refrigerant circuit includes a condenser, an evaporator, a compressor, and an expansion device. An evaporator air flow path through the evaporator and a condenser air flow path through the condenser are formed in the housing. At least one of the evaporator air flow path and the condenser air flow path receives air from at least one of an environment, a passenger compartment of a vehicle, and any mixture of thereof.

11 Claims, 5 Drawing Sheets

(56) References Cited

U.S. PATENT DOCUMENTS

| | | | |
|---|---|---|---|
| 5,386,704 A * | 2/1995 | Benedict | B60H 1/00392 454/161 |
| 5,975,191 A * | 11/1999 | Ohashi | B60H 1/00035 165/43 |
| 6,007,421 A * | 12/1999 | Schwarz | B60H 1/00678 137/601.18 |
| 2006/0080986 A1* | 4/2006 | Inoue | 62/259.2 |
| 2009/0193830 A1* | 8/2009 | Yoshioka | B60H 1/0005 62/239 |
| 2011/0036117 A1* | 2/2011 | Frohling | B60H 1/00028 62/507 |

FOREIGN PATENT DOCUMENTS

| | | |
|---|---|---|
| DE | 19824461 A1 | 12/1999 |
| DE | 10253357 A1 | 6/2004 |
| DE | 602005004667 T2 | 1/2009 |
| DE | 102009028522 A1 | 5/2011 |
| FR | 2743027 A1 | 7/1997 |
| JP | 57-178913 * | 4/1982 |
| JP | 57-178913 A | 11/1982 |
| JP | 59-084615 A | 5/1984 |
| JP | 05-155236 A | 6/1993 |
| JP | 05-221229 A | 8/1993 |
| JP | 05-270253 A | 10/1993 |
| JP | 7009844 A | 1/1995 |
| JP | 8216667 A | 8/1996 |
| JP | 09-240253 A | 9/1997 |
| JP | 2002310310 A * | 10/2002 |
| JP | 2003291635 A | 10/2003 |
| JP | 2004001674 A | 1/2004 |
| JP | 2007-168619 A | 7/2007 |
| JP | 2009023564 A | 2/2009 |
| JP | 2011037434 A | 2/2011 |
| WO | 2007042065 A1 | 4/2007 |

* cited by examiner

MODULAR AIR CONDITIONING SYSTEM WITH HEAT PUMP FUNCTIONALITY

CROSS-REFERENCE TO RELATED APPLICATION

This application claims the benefit of German Patent Application No. DE 10 2011 052 752.4 filed Aug. 16, 2011, the entire disclosure of which is hereby incorporated herein by reference.

FIELD OF THE INVENTION

The invention relates to a vehicle air-conditioning unit with heat pump functionality for heating, cooling and dehumidifying air within an interior of a motor vehicle, particularly electric and hybrid vehicles.

BACKGROUND OF THE INVENTION

In order to condition air that is to be supplied to an interior of a vehicle, vehicle air-conditioning units typically include a chiller for cooling the air and a glycol-air heat exchanger for heating the air, as well as glycol-air heat pumps and air-air heat pumps.

The current vehicle air-conditioning systems include various individual components. For example,
  a condenser, arranged at a front of the vehicle;
  a compressor, connected to and driven by an engine of the vehicle;
  an air-conditioner, arranged in a passenger compartment to supply passengers with conditioned air; and
  refrigerant lines.

The above components are usually delivered individually to a vehicle production locale and mounted. Due to the number of components on a manufacturing line at a manufacturing plant, several assembly steps are required. In addition, a plurality of connections which have to be established during an assembly of the vehicle air-conditioning unit. As a result, potential leaks, which are costly to correct, may occur.

A solution of a premounted system is described in DE 102007046663 A1. An air conditioning system having a z-shaped arrangement of a blower-heat exchanger arrangement is disclosed. In addition, a closed, prefilled refrigeration loop is described in DE 102007046663

For a heating operation, vehicle air-conditioning units with air-glycol heat exchangers as glycol-air heat pumps are described in DE 102 53 357 A1 and JP7009844, and with air-air heat pumps in DE 42 44 137 C2, JP8216667 and JP2003291635, in the prior art.

Efficient refrigeration loops for the refrigerant R134a exist for a cooling operation.

Disadvantages of the prior art, which occur in the heating operation, are that, at low ambient temperatures, for example below −10° C., a cooling water temperature no longer reaches a level required for a comfortable heating of the passenger compartment in the case of efficient combustion engines, such as, diesel and Otto engines with direct injection. It is to be expected that these problems will worsen in future developments, such as, for example, in hybrid vehicles. For that reason, efficient auxiliary heating designs have to be used.

Further, there is a trend toward complete electrification of a drive system. Due to an efficient energy conversion from the drive battery waste heat available for heating the interior is further reduced. In addition, the energy quantity stored in the battery is considerably smaller than in the prior art. Thus, in future electric vehicles, power required for air conditioning the interior has a substantial influence on a range of the vehicle.

An additional disadvantage of the prior art with glycol-air heat pumps, is that the pumps use the cooling water of the combustion engine as a heat source. In the process, heat is removed from the cooling water. As a result, the combustion engine is operated for a longer duration at lower temperatures. This has a negative effect on exhaust gas emissions and on fuel consumption.

Due to an intermittent operation of the combustion engine in hybrid vehicles, a sufficient cooling water temperature is not reached, even in the case of longer trips. Consequently, a start-stop operation of the combustion engine is interrupted at low ambient temperatures.

Air-air heat pumps remove heat from the ambient air. Under some circumstances, this can lead to icing of the condenser, which functions as an evaporator when the heat pump is operated. If icing is avoided by way of an intelligent adjustment of the heat pump, the usable heating power of the heat pump is reduced as a result. If icing of the gas chiller is acceptable, the heat pump can be actively thawed by a brief operation of the refrigerant circuit as an air-conditioning unit. This reduces the average effective output of the heat pump.

Heat pump systems that release an output to the air are typically not capable of simultaneously dehumidifying and heating the air supplied to the vehicle. Consequently, the air conditioning of the vehicle, in case of low ambient temperatures, cannot be operated with recirculated air (i.e. air which has been recirculated from the vehicle interior.) Due to an absence of a dehumidification function, this would lead to inside steaming up of windows of the vehicle due to condensation.

Heat pump systems as well as fuel auxiliary heaters, which release their outputs to the engine cooling circuit, typically lack dynamics and present a low efficiency.

In DE 102009028522 A1, a compact air conditioning unit having a heat pump functionality is described. However, the heat pump functionality is implemented by an active switching of the cooling circuit. This leads to great complexity in the cooling circuit, which is associated with correspondingly high costs and technical risk.

In DE 602005004667 T2, an installation is described which works with absorbing plates. The system works cyclically, so that adjacently arranged heat-exchange units continuously switch from heating to cooling and vice versa. A second heat exchanger behaves anti-cyclically, and for that reason, for heating or cooling, a flap which can also be adjusted cyclically leads air, depending on the need, into a passenger compartment or into the environment. A reheating operation for cooling and dehumidifying the air, and subsequent reheating or continuous operation, are evidently not possible. Partial use of recirculated air is not described. Due to the cyclically moving flaps, the installation is technically very complex.

In DE 19824461 A1, a basic structure with heat exchangers arranged in parallel, and with parallel air flow, as well as discharge and mixing functions, is described. A reheating function or possibilities for partial use of recirculated air is not discernible. There is only one direction of flow where the air cannot be led out of the interior via the first heat exchanger, while outside air flows against the second heat exchanger.

In WO 2007042065 A1, a common holding fixture for components of an installation is described. A heating function, a partial use of recirculated air, or a mixing of the air flows is not discernible.

The problem of the invention now consists in providing an air conditioning system with heating functionality, which meets all the requirements, even in environments with heat sources of low capacity, such as, for example, in energy-efficient combustion engines or hybrid drives consisting of a combustion engine and an electric motor, or, in the case of absence of heat sources, of a drive system, such as, for example, in electrically driven motor vehicles; and in providing a method for the operation thereof.

It would be desirable to produce an air-conditioning unit with heat pump functionality which maximizes performance and efficiency and minimizes cost.

SUMMARY OF THE INVENTION

In concordance and agreement with the present invention, an air-conditioning unit with heat pump functionality which maximizes performance and efficiency and minimizes cost, has been surprisingly invented.

In one embodiment, a modular vehicle air-conditioning unit for heating and cooling air, comprises: a refrigerant circuit including a condenser, an evaporator, a compressor, and an expansion device; and a housing including the evaporator and the condenser disposed therein, and an evaporator air flow path through the evaporator and a condenser air flow path through the condenser formed therein, wherein at least one of the evaporator air flow path and the condenser air flow path receives air from at least one of an environment, a passenger compartment of a vehicle, and any mixture of thereof, and wherein a flow of air through at least one of the evaporator air flow path and the condenser air flow path is selectively controlled to facilitate at least one of a heating and a cooling of the passenger compartment of the vehicle.

In another embodiment, a modular vehicle air-conditioning unit for heating and cooling air, comprises: a refrigerant circuit including a condenser, an evaporator, a compressor, and an expansion device; and a housing including the evaporator and the condenser disposed therein, and an evaporator air flow path through the evaporator and a condenser air flow path through the condenser formed therein, wherein at least one of the evaporator air flow path and the condenser air flow path receives air from at least one of an environment, a passenger compartment of a vehicle, and any mixture of thereof, and wherein a flow of air through at least one of the evaporator air flow path and the condenser air flow path is selectively controlled to facilitate at least one of a heating and a cooling of the passenger compartment of the vehicle, and wherein the flow of air through at least one of the evaporator air flow path and the condenser air flow path is divided into a plurality of partial mass flows.

The invention also includes a method for conditioning air in an interior of a vehicle.

In one embodiment, the method comprises the steps of: providing an air-conditioning unit including a refrigerant circuit, the refrigerant circuit including a condenser, an evaporator, a compressor, and an expansion device, wherein the evaporator and the condenser are disposed in a housing, the housing includes an evaporator air flow path through the evaporator and a condenser air flow path through the condenser formed therein; and adjusting at least one air-side partial mass flow of at an outlet of at least one of the condenser and the evaporator to switch between a cooling operation and a heating operation of the air-conditioning unit.

The problem of the prior art is solved by the characteristics of the independent claims. Variants of the invention are indicated in the dependent claims.

In particular, the problem is solved by a modular vehicle air-conditioning unit for heating and cooling air, which comprises a housing with at least one blower and with flaps for setting air flow paths, and a refrigerant circuit with a condenser, an evaporator, a compressor, and an expansion device with associated connecting lines, and which is characterized in that, in the housing, an evaporator air flow path through the evaporator and a condenser air flow path through the condenser are formed, wherein each air flow path is formed so it can be supplied with fresh air from the environment, with recirculated air from the passenger compartment, or with a mixture of the two, and in that the two air flow paths are connected to each other via controllable flaps in such a manner that the heating or cooling of the vehicle interior occurs only by the setting of the flow path of the air.

The housing of the air-conditioning unit is preferably formed by two housing portions, wherein an air flow path can be formed in each housing portion. According to an embodiment of the invention, a design of the housing portions for the evaporator air flow path and for the condenser air flow path is mirror symmetrical.

An advantageous variant of the invention includes a third housing portion, wherein the third housing portion receives all the cooling circuit components over which air does not flow.

The two housing portions that guide the flow paths can be provided with a common blower for conveying the air for the two flow paths. In this manner, an additional drive for the second flow path can be omitted, which entails advantages in terms of construction, as well as cost advantages.

Moreover, it is advantageous that the two flow paths can be separated or connected on the air side by means of a reheat flap.

At the end of each flow path, the air is divided into two partial mass flows, of which one partial mass flow of air is formed so it can be led to the passenger compartment and a second partial mass flow of air so it can be led to the environment.

Alternatively to the compact design of the air-conditioning unit, the two air-conveying housing portions are designed and mutually arranged differently from each other, depending on an installation space present in the vehicle, in such a manner that a placement of the air-conditioning unit beneath the passenger compartment, at a cowl, in an engine compartment, or in a trunk can be implemented.

In an advantageous embodiment of the invention, a chiller is arranged, and incorporated by means of refrigerant lines in the refrigerant circuit, for the conditioning of the air in the vehicle interior and for the additional cooling of a drive battery, of a power electronics unit or of another component of the vehicle.

The method according to the invention for operating the refrigerant circuit with heat pump functionality for heating, cooling and dehumidifying the air of the vehicle interior of the vehicle is characterized in that a switching between the cooling and the heating operation and/or an implementation of a reheating operation occurs only by an adjustment of air-side partial mass flows at an outlet of the condenser and of the evaporator, wherein the partial mass flows to be supplied to the interior are adjusted in such a manner that a required temperature for the supply air for the passenger compartment is reached.

According to another embodiment of the invention, a modular air-conditioning unit is used for the heating and the cooling air for the conditioning of air in the vehicle interior. The modular air-conditioning unit includes a condenser, an evaporator, a compressor, and an expansion device, which are connected by lines to a cooling circuit. All the components together form a compact, preassembled system with at least one blower and two fresh air/recirculated air systems. All the components of the system are arranged in two air-conveying housing portions in each of which a flow path is formed. The system which conveys a refrigerant includes a cooling unit, and dispenses with the need for switching valves for the refrigerant, as required in conventional combined systems of cooling devices/heat pumps for implementing the heat pump functionality. The desired heating and cooling processes for the vehicle interior are achieved using only skilled switching of the air flows on the air side, without an expensive connected circuit for cooling devices/heat pumps.

The adjustment design of the installation, in contrast to systems according to the prior art, is that no switching of the cooling unit, that is of the refrigerant-conveying components, to a heat pump occurs. Instead, the heat pump functionality, that is a use of environmental heat from the air or from waste heat from the vehicle via the refrigerant circuit for heating the vehicle interior occurs only by means of an air-side switching of the air flows.

The core of the invention therefore is not implementing the refrigerant circuit as a combined cooling device and heat pump, producing instead the effect of a heat pump only by means of a housing with corresponding flaps. The result of the routing of air flow is obtaining a heat pump functionality of the cooling device.

Thus, the embodiments according to the invention are compact air-conditioning units for mobile uses. The cooling circuit can be designed for refrigerants R134a, R1234yf or R744, and is preferably provided with an electric compressor, and completely integrated in the compact air-conditioning unit. The cooling circuit thus advantageously has no dynamic seals with respect to the environment, and it is therefore technically leak-free and can be filled before assembly into the vehicle or before delivery of the air-conditioning unit.

According to an advantageous embodiment of the invention, a compact system which can be preassembled is therefore proposed, which is delivered with one or two blowers, as well as with two fresh/recirculated air systems. The apparatus can be placed beneath the passenger compartment, at the cowl, in the engine compartment or in the trunk. The air-conditioning device can include two or three housing portions, two of which in each case provide a flow path for the air guided through the components. The two housing portions are each provided with a blower for conveying the air for the respective flow path, or alternatively the two flow paths can be supplied by a common blower. Each flow path can here be supplied with fresh air from the environment, with recirculated air from the vehicle interior, or with a mixture of the two. Moreover, at an end of each flow path, the air can be divided into two partial mass flows. In the process, from each flow path, a partial mass flow is led to the vehicle interior, and a partial mass flow is led into the environment.

The two housing portions can here be arranged differently with respect to each other, depending on the installation space present in the vehicle.

The third housing portion, if present according to an advantageous embodiment, contains all the cooling circuit components over which air does not flow.

The cooling circuit includes two heat exchangers, a condenser, and an evaporator. Moreover, the cooling circuit preferably has an electric compressor and a preferably electrically adjustable expansion device. The heat exchangers, the condenser, and the evaporator are connected to each other by means of four lines.

An additional advantageous embodiment is a variant of the cooling circuit with incorporation of a chiller for cooling a drive battery or for heat absorption from a refrigerant circuit. Here, the chiller must also be provided with an additional isolation or expansion valve.

A switching between the cooling operation and the heating operation, or an implementation of a reheating operation, occurs by adjusting the air-side partial mass flows at the outlet of the condenser and of the evaporator. In the process, the partial mass flows to be supplied to the interior are regulated in such a manner that the temperature and mass flow required for the supply air for the passenger compartment are reached.

Accordingly, the invention deviates significantly in terms of adjustment strategy from the adjustment strategies according to the prior art, and it is particularly advantageous for the adjustment of air conditioning system for passenger cars.

The individual aspects of the invention are:
a highly efficient heat pump system capable of simultaneously heating and dehumidifying;
rapid provision of warm air in case of low ambient temperatures;
a reduction of the required power for heating the vehicle interior, that is the possibility of heating during recirculated air operation, or with a high recirculated air proportion;
prefilled, hermetic cooling circuit;
minimal complexity in the cooling circuit, (i.e. an absence of switching valves) and minimization of the number of expansion valves as well as minimization or even elimination of the use of refrigerant sections with parallel through flow;
alternative arrangements in the vehicle including the undercarriage, in the trunk, or on the firewall, in the engine compartment.

The advantages and characteristics of the invention compared to the prior art include, but are not limited to:
reduced complexity compared to other auxiliary heating systems with comparable functionality;
few "active" components: compressor and optionally an externally adjustable expansion valve, and consequently low complexity;
few additional components, resulting in a cost effective implementation;
simultaneous dehumidification and heating of the vehicle interior,
reduction of the required maximum heating power for the heat pump by enabling operation with recirculated air;
if an electric compressor is used, the heating power is available independently of the combustion engine;
alternative air flows in the vehicle can be implemented in a simple manner;
reduction of fuel consumption by using "free" ambient heat;

no refrigerant leaks when using a hermetic system in the case of an electric compressor;

lower usage of electrical or fossil energy for passenger comfort;

complete connected delivery of the prefilled installation, to be able to ensure the assembly and filling of the individual components;

no need for tubes for the assembly or to compensate for relative movements when an electric compressor is used;

optimized vehicle assembly at the vehicle manufacturing plant; and fewer quality-related problems and less reworking at the vehicle manufacturing plant resulting from the provision of a previously tested system.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
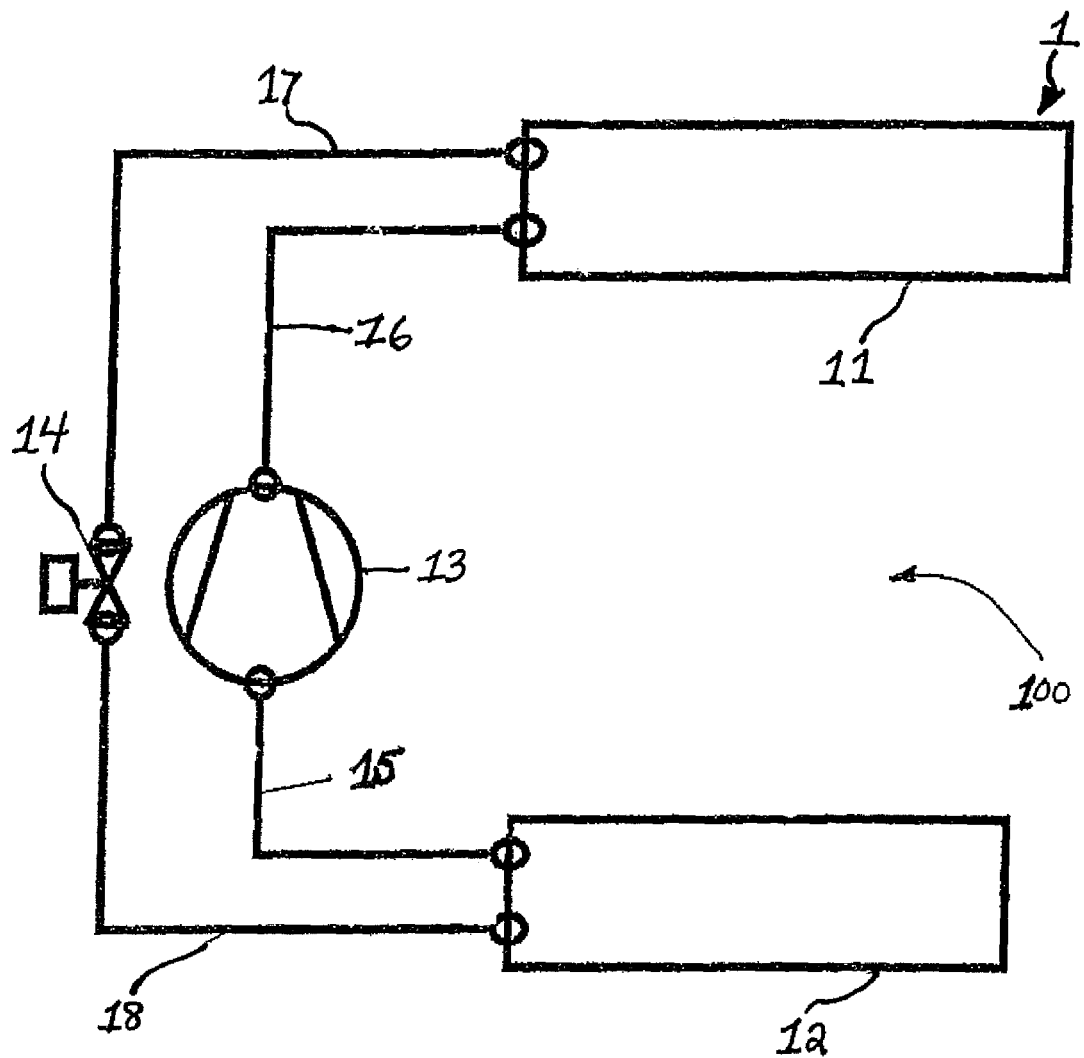
FIG. 1 is a schematic diagram of a circuit arrangement of a cooling circuit of a modular vehicle air-conditioning unit for conditioning air in an interior of a vehicle according to an embodiment of the invention.

FIG. 1 shows a refrigerant circuit 100 of a cooling device for a vehicle air-conditioning unit 1. The refrigerant circuit 100 includes a condenser 11, an evaporator 12, an electrically driven compressor 13, and an electrically adjustable expansion device 14, which are connected to each other by connecting lines 15, 16, 17 and 18. The compressor 13 is completely integrated in the compact modular vehicle air-conditioning unit 1. A cooling circuit has no dynamic seals with respect to the environment, and thereby substantially leak-free and can be filled with refrigerant before an assembly in a vehicle or before delivery at a vehicle manufacturing plant. The evaporator 12, which is capable of absorbing heat and cooling a supply air of the vehicle, allows a refrigerant vapor to reach the compressor 13, through the evaporator-compressor connecting line 15, wherein the refrigerant vapor is compressed. The compressed refrigerant vapor is led via the compressor-condenser connecting line 16 into the condenser 11, where the refrigerant vapor condenses while releasing heat. Via the condenser-expansion device connecting line 17 the condensate flows to the expansion device 14, from which the refrigerant returns in an expanded state via the expansion device-evaporator connecting line 18 into the evaporator 12. In this manner, required temperature levels are made available for a compact modular vehicle air-conditioning unit 1, and for corresponding requirements for a cooling, a dehumidification and a heating of air for passenger compartment of a vehicle.

Figure 2:
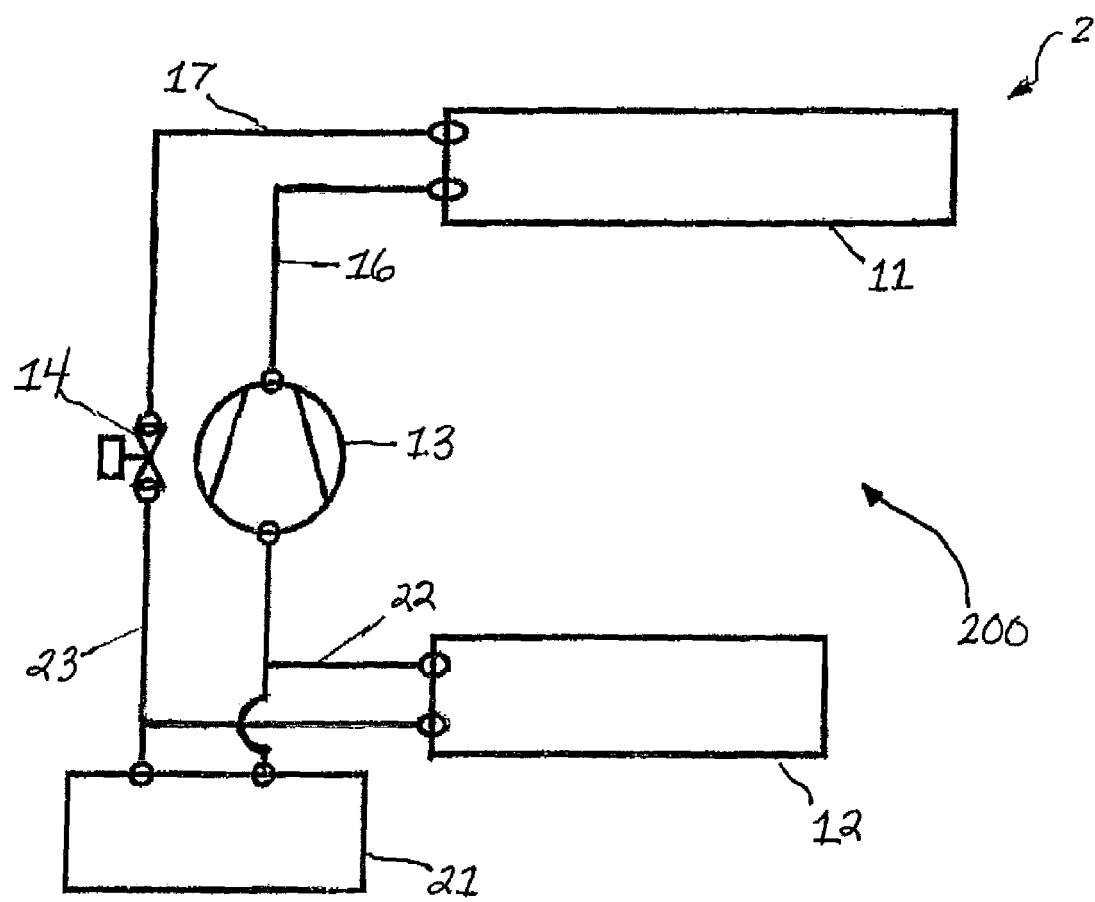
FIG. 2 is a schematic diagram of a circuit arrangement of a cooling circuit with a chiller for battery cooling of a modular vehicle air-conditioning unit for conditioning air in an interior of a vehicle according to another embodiment of the invention, wherein the chiller can be used additionally as a heat source for a heat pump operation.

In FIG. 2, a refrigerant circuit 200 for a vehicle air-conditioning unit 2 is shown. The refrigerant circuit 200 includes an additional evaporator as chiller 21 for heat absorption for the refrigerant circuit 200. The refrigerant circuit 200 further includes the condenser 11, the evaporator 12, the electrically driven compressor 13, and the electrically adjustable expansion device 14. The condenser 11, the evaporator 12, the compressor 13, the expansion device 14, and the chiller 21 shown are connected to each other by connecting lines 16, 17, 22 and 23. The compressor 13 is preferably integrated completely in a compact modular vehicle air-conditioning unit 1. A cooling circuit has no dynamic seals with respect to the environment, and thereby, substantially leak-free, and can be filled with refrigerant before an assembly in a vehicle or before delivery at a vehicle manufacturing plant. The evaporator 12 is capable of absorbing heat, and, via the evaporator-compressor-chiller connecting line 22, allows a refrigerant vapor to reach the compressor 13, wherein the refrigerant vapor is compressed. The compressed refrigerant vapor is led, via the compressor-condenser connecting line 16, into the condenser 11, where the refrigerant vapor condenses with heat release. Via the condenser-expansion device connecting line 17, the condensate flows to the expansion device 14, from which the refrigerant reaches, in the expanded state, the chiller 21 via the expansion device-evaporator-chiller connecting line 23, and in parallel or alternatively, the evaporator 12. According to the embodiment of the invention, the chiller 21 is provided with an additional isolation or expansion valve (not shown). In this manner, necessary temperature levels are made available for a compact modular vehicle air-conditioning unit 2 with the chiller 21 for corresponding requirements for cooling and heating air for a passenger compartment of a vehicle and for cooling, for example, a battery, power electronics or other components of a vehicle. In an air-side connection with heat pump functionality, waste heat of water-cooled drive components can be used as a heat source.

Figure 3:
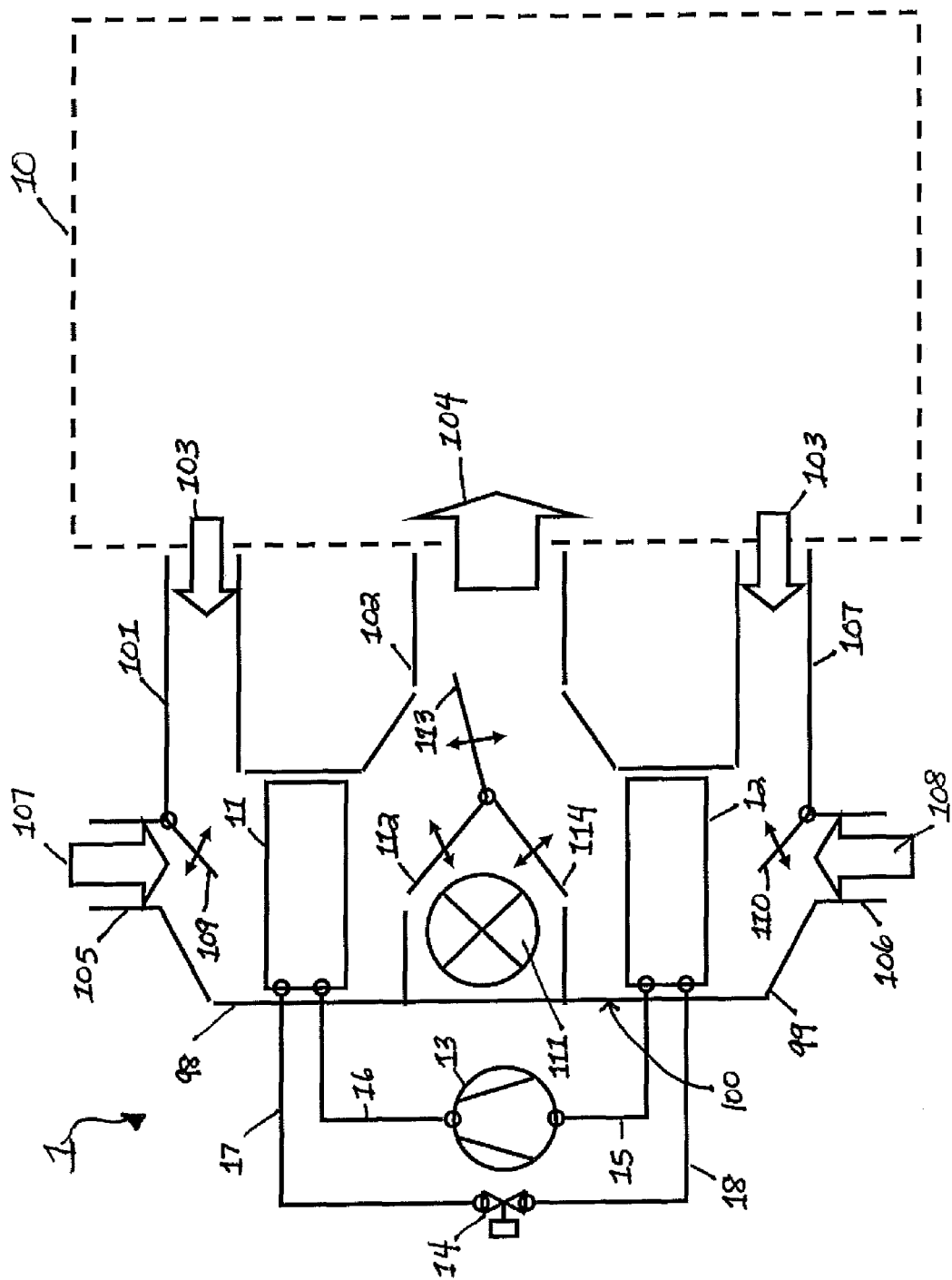
FIG. 3 is a schematic diagram of a modular vehicle air-conditioning unit according to an embodiment of the invention, wherein the air-conditioning unit includes heat pump functionality via an adjustment and control of air-side volume flows for conditioning air in an interior of a vehicle.

In FIG. 3, an embodiment of the modular vehicle air-conditioning unit 1 according to the invention, with a refrigerant circuit 100 with heat pump functionality is shown. FIG. 3 also shows placement of the modular vehicle air-conditioning unit 1 in an overall structure of a vehicle, and in particular in the relation between an outside air and a passenger compartment 10. The conventional cooling circuit explained in FIG. 1 is implemented by means of an air-side connection in FIG. 3 in a cooling device with heat pump functionality. In a first housing portion 99 of an evaporator side, an outside air feed flow 108 is suctioned by a blower (not shown). Through an outside air feed duct 106, after passing an adjustment flap 110 for a supply air flow, the outside air reaches the evaporator 12, cools, and reaches, and after passing adjustment flaps 114, 113 in a supply air flow 104, the passenger compartment 10 through a supply air duct 102. In a similar manner, in a second housing portion 98 of a condenser side, an outside air feed flow 107 is suctioned by a blower (not shown). Through an outside air feed duct 105, after passing an adjustment flap 109 for a supply air flow, the outside air reaches the condenser 11, is warmed, and after passing the adjustment flaps 112, 113 in the supply air feed 104, the outside air reaches the passenger compartment 10 through a supply air duct 102.

Waste air flows 103 from the passenger compartment 10, driven by a blower (not shown), are led through waste air ducts 101 from the passenger compartment 10, after passing the adjustment flaps 112, 113, 114, depending on a position of the adjustment flaps 112, 113, 114, entirely or partially to the condenser 11 or supplied to the evaporator 12.

A switching between a cooling and heating operation or an implementation of a heating operation for a cooling and a dehumidification of the air for the passenger compartment 10 of a vehicle and a reheating, occurs by an adjustment of air-side partial mass flows at an outlet of the condenser 11 and of the evaporator 12. By adjusting the partial mass flows via the position of the flaps 112, 113, 114, the partial mass flows that are not needed in the interior are led, after the evaporator 12 or after the condenser 11, through a waste air duct 111 into the environment.

Figure 4:
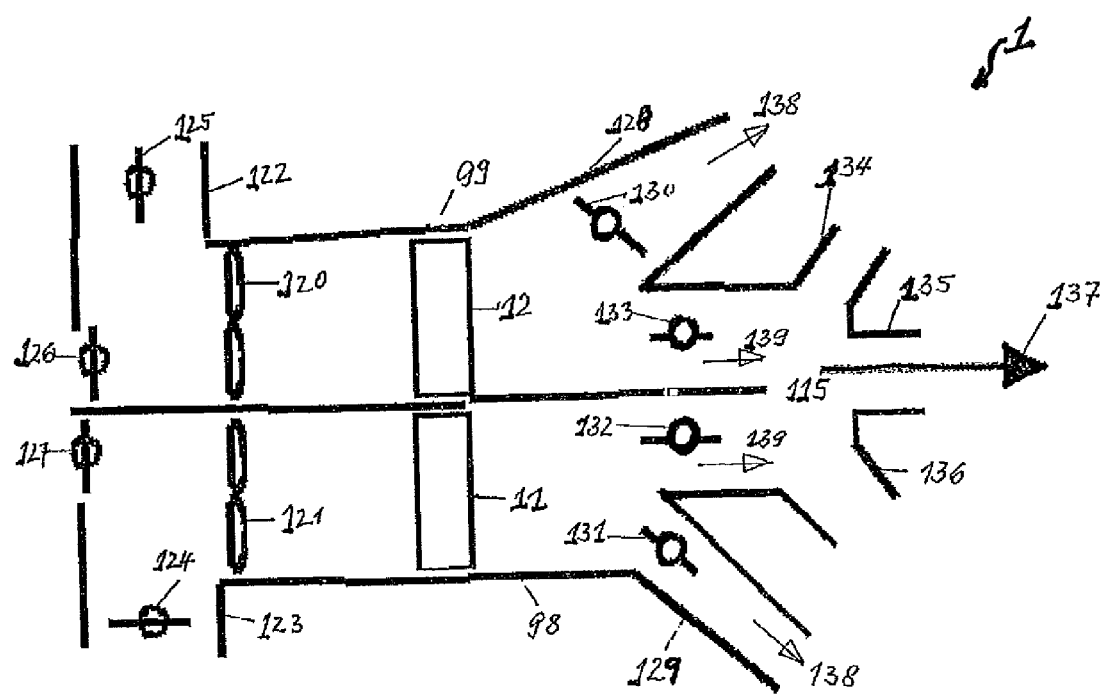
FIG. 4 is a schematic diagram of a modular vehicle air-conditioning unit according to another embodiment of the invention, wherein the air-conditioning unit includes heat pump functionality and two blowers for conditioning air in an interior of a vehicle.

In FIG. 4, a modular vehicle air-conditioning unit 1 according to another embodiment of the invention with heat pump functionality and two blowers 120, 121 is shown. The blowers 120, 121, which can be adjusted separately, enhance dynamics in comparison to other systems, because a cold air side can be supplied by means of the evaporator 12, and a warm air side by means of the condenser 11, with air flows flowing at different speeds, and thus, a rapid reaction to changed operating conditions is possible.

The blower 120 of the evaporator side of the housing, in the first housing portion 99 of the evaporator side, pulls air through a supply air duct 122 of the evaporator side via an adjustment flap outside air flow 125 of the evaporator side, if open, or via an adjustment flap for recirculated air 126 of the evaporator side, if open, and leads it to the evaporator 12, where it is cooled to constitute the cold air flow.

The cold air flow exiting from the evaporator 12 can be divided into a partial mass flow of air 138 into the environment and a partial mass flow of air 139 into the passenger compartment 10 at a required ratio, or allocated completely to one path. This occurs via flaps 130, 133.

The cold air of a partial mass flow of air 138 reaches the environment via a waste air duct cold air 128.

The cold air of a partial mass flow of air 139 for the passenger compartment 10 reaches the mixing compartment 115 via a flap 133. The mixing compartment for the warm and for the cold partial mass flow of air 139 is formed behind the flaps 133, 132.

Similar to the blower 120, the blower 121, in the second housing portion 98 of the condenser side, pulls air through a supply air duct 123 of the condenser side via an adjustment flap outside air flow 124 of the condenser side, if open, or via an adjustment flap for recirculated air flow 127 of the condenser side, if open, and leads it to the condenser 11, where the air is warmed to constitute a warm air flow.

The warm air flow exiting from the condenser 11 can be divided into a partial mass flow of air 138 into the environment and into a partial mass flow of air 139 into the passenger compartment at a required ratio, or it can be allocated completely to one path. This occurs via the flaps 131 and 132.

The warm air of the partial mass flow of air 138 reaches the environment via a waste air duct for warm air 129.

The warm air of the partial mass flow of air 139 reaches the mixing compartment 115 through the adjustment flap for warm air 132.

From the mixing compartment 115, the mixed air is led to the passenger compartment via an air duct 134 window defroster to inner sides of windows in the passenger compartment 10, through a duct 136 into a foot space, and through an air duct 135 as an air flow centrally onto a person 137. A required distribution of the air to the individual ducts is achieved in accordance with the requirements by control elements (not shown), for example, flaps.

If the air throughput is excessive in comparison to a need for the interior of the vehicle, which may happen under certain operating conditions, the excess air is led into the environment through the waste air ducts 128, 129.

Figure 5:
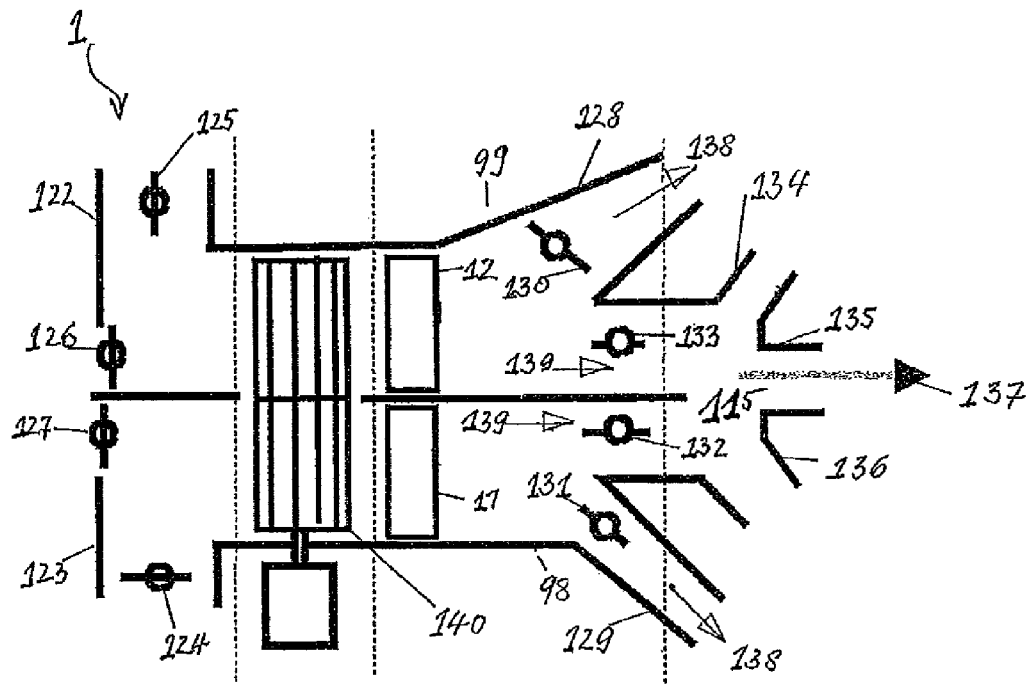
FIG. 5 is a schematic diagram of a modular vehicle air-conditioning unit according to yet another embodiment of the invention, wherein the air-conditioning unit includes heat pump functionality and a single blower for conditioning air in an interior of a vehicle.

In FIG. 5, a modular vehicle air-conditioning unit 1 according to another embodiment of the invention with heat pump functionality is shown. In contrast to FIG. 4, the air-conditioning unit 1 of FIG. 5 has a common blower 140 for the cold air side and the warm air side.

A construction of the modular vehicle air-conditioning unit 1 is simplified, but requires an adapted adjustment of an operation thereof, because the two sides of the blower have to be supplied, and air quantities and temperatures for the passenger compartment 10 can be influenced only via a setting of the adjustment flaps 130, 131, 132, 133. The air quantities per flow path have to be controlled by the intake flaps 124, 125, 126, 127. As illustrated, the blower 140 is divided into two sections.

The construction and the function of the vehicle air-conditioning unit 1, with the exception of the blower 140, are identical to those shown in FIG. 4, so that reference is made here to the description relating to FIG. 4.

Figure 6:
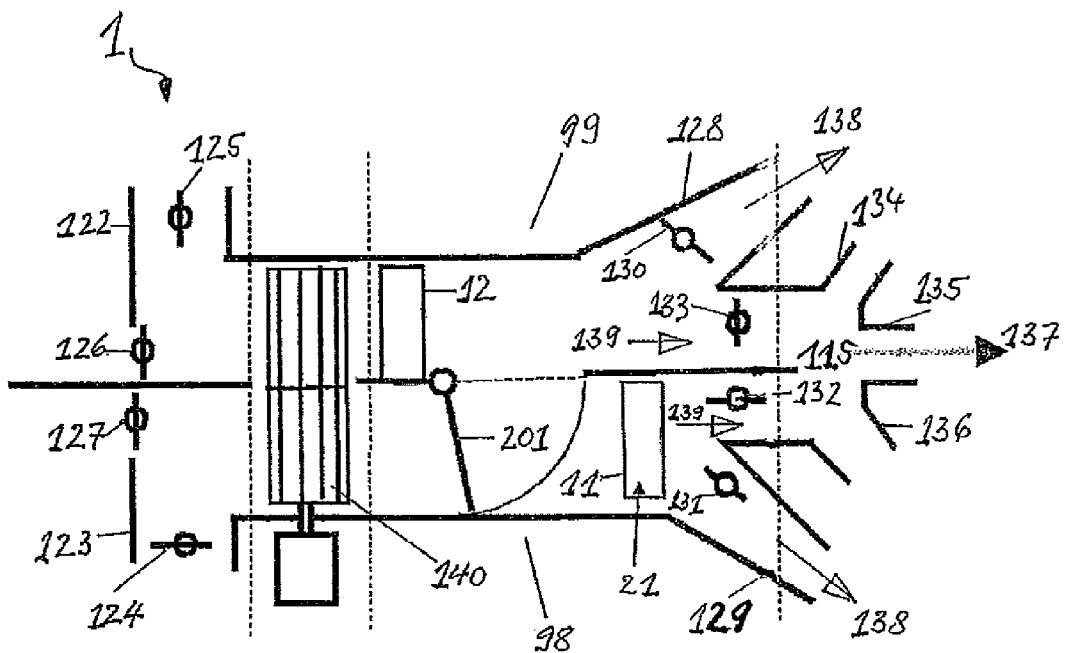
FIG. 6 is a schematic diagram of a modular vehicle air-conditioning unit according to another embodiment of the invention, wherein the air-conditioning unit includes heat pump functionality and a reheating function for conditioning air in an interior of a vehicle.

FIG. 6 shows a modular vehicle air-conditioning unit 1 according to another embodiment of the invention with heat pump functionality. In contrast to the embodiment shown in FIG. 5, the air-conditioning unit 1 of FIG. 6 implements a reheating function. The reheating function is facilitated by an adjustment flap 201 for the air flow between the evaporator 12 and the condenser 11, or the blower 140 and the condenser 11.

The blower 140 in the first housing portion 99 of the evaporator side pulls air through the supply air duct 122 of the evaporator side via the adjustment flap for outside air flow 125 of the evaporator side, if open, or via the adjustment flap for recirculated air 126 of the evaporator side, if open, and leads it to the evaporator 12, where it cools. The cold air flow is divided into a partial mass flow of air 138 into the environment and a partial mass flow of air 139 into the mixing compartment 115. If needed, cold air can be discharged outward through the waste air duct 128 for cold air, if the adjustment flap 130 for cold waste air is open.

In parallel to this, the blower 140 in the second housing portion 98 of the condenser side pulls air through the supply air duct 123 of the condenser side through the adjustment flap for outside air flow 124 of the condenser side, if open, or through the adjustment flap recirculated air flow 127 of the condenser side, if open, and leads it, if an adjustment flap 201 for the air flow between the blower 140 and the condenser 11 is open in the direction of flow, to the condenser 11, or to the chiller 21, where it warms. The warm air flow divides into the partial mass flow of air 138 into the environment and the partial mass flow of air 139 into the passenger compartment. The warm air reaches the mixing compartment 115 through the adjustment flap for warm air 132.

From the mixing compartment 115, the mixed air, similarly to the designs according to FIG. 4 and FIG. 5, is led to the passenger compartment 10 via the air duct 134 window defroster to the inner sides of the windows in the passenger compartment 10, through the duct 136 into the foot space, and through the air duct 135 as an air flow centrally onto the person 137. A required distribution of the air to the individual ducts is achieved in accordance with the requirements by control elements (not shown), for example, by flaps.

In a reheating operation, the cold air flow, as represented in FIG. 6, is directed to the condenser 11, after the evaporator 12 with the adjustment flap 201 open, and the adjustment flap 133 partially or completely closed, so that the dehumidified cold air flow is warmed again on the condenser 11, before it reaches at least partially the passenger compartment 10 through the mixing compartment 115.

From the foregoing description, one ordinarily skilled in the art can easily ascertain the essential characteristics of this invention and, without departing from the spirit and scope thereof, make various changes and modifications to the invention to adapt it to various usages and conditions.

LIST OF REFERENCE NUMERALS

1 Modular vehicle air-conditioning unit in a basic design
2 Modular vehicle air-conditioning unit with chiller
10 Passenger compartment
11 Condenser
12 Evaporator
13 Electrically driven compressor
14 Electrically adjustable expansion device
15 Evaporator-compressor connecting line
16 Compressor-condenser connecting line
17 Condenser-expansion device connecting line
18 Expansion device-evaporator connecting line
21 Chiller
22 Evaporator-compressor and chiller connecting line
23 Expansion device-chiller and evaporator connecting line
98 Second housing portion of the condenser side
99 First housing portion of the evaporator side
100 Refrigerant circuit
101 Waste air duct from the passenger compartment
102 Supply air duct to the passenger compartment
103 Waste air duct from the passenger compartment
104 Supply air duct to the passenger compartment
105 Outside air feed duct to the condenser
106 Outside air feed duct to the evaporator
107 Outside air feed flow to the condenser
108 Outside air feed flow to the evaporator
109 Adjustment flap for the outside air feed flow to the condenser
110 Adjustment flap for the outside air feed flow to the evaporator
111 Waste air duct
112 Adjustment flap for the air feed flow from the condenser
113 Adjustment flap for the supply air flow to the passenger compartment
114 Adjustment flap for the air feed flow to the evaporator
115 Mixing compartment behind the flaps 132 and 133
120 Blower of the evaporator side
121 Blower of the condenser side
122 Supply air duct of the evaporator side
123 Supply air duct of the condenser side
124 Adjustment flap for the outside air flow of the condenser side
125 Adjustment flap for the outside air flow of the evaporator side
126 Adjustment flap for the recirculated air flow of the evaporator side
127 Adjustment flap for the recirculated air flow of the condenser side
128 Waste air duct for cold air
129 Waste air duct for warm air
130 Adjustment flap for cold waste air
131 Adjustment flap for warm waste air
132 Adjustment flap for warm air to the passenger compartment
133 Adjustment flap for cold air to the passenger compartment
134 Air duct for window defroster
135 Air duct centrally onto a person
136 Air duct for foot space heating
137 Air flow centrally onto a person
138 Partial mass flow of air into the environment
139 Partial mass flow of air into the passenger compartment
140 Common blower
200 Refrigerant circuit of the enlarged design
201 Adjustment flap for air flow between the evaporator side and the condenser side

What is claimed is:

1. A modular vehicle air-conditioning unit for heating and cooling air, comprising:
a refrigerant circuit including a condenser, an evaporator, a compressor, and an expansion device; and
a housing including the evaporator and the condenser disposed in the housing, an evaporator air flow path through the evaporator and a condenser air flow path through the condenser independently formed from each other within the housing, and a mixing compartment disposed downstream of the evaporator and the condenser wherein a flow of air through the evaporator and a flow of air through the condenser are mixed, wherein a common waste air duct for waste air flow through the evaporator and waste air flow through the condenser is disposed between the evaporator and the condenser and upstream of the mixing compartment; wherein the evaporator air flow path and the condenser air flow path respectively receive air from at least one of an environment, a passenger compartment of a vehicle, and any mixture thereof, wherein a first adjustment flap is disposed between the evaporator and an inlet of the common waste air duct, a second adjustment flap is disposed between the condenser and the inlet of the common waste air duct, and a third adjustment flap is disposed within the housing between the inlet to the common waste air duct and an inlet to the passenger compartment of the vehicle, wherein the first adjustment flap, the second adjustment flap, and the third adjustment flap are independently rotatable about a common axis of rotation, wherein the third adjustment flap is configured to selectively control each of the flow of air through the evaporator air flow path and the flow of air through the condenser air flow path to facilitate at least one of a heating and a cooling of the passenger compartment of the vehicle, and wherein the waste air duct releases a flow of waste air to an environment separate from the passenger compartment.

2. The modular air-conditioning unit according to claim 1, wherein the housing includes a first housing portion and a second housing portion formed therein.

3. The modular air-conditioning unit according to claim 2, wherein each of the first housing portion and the second housing portion includes one of the evaporator air flow path and the condenser air flow path formed therein.

4. The modular air-conditioning unit according to claim 1, wherein the refrigerant circuit is configured to facilitate a conditioning of air in the interior of the vehicle and a cooling of at least one of a drive battery, at least one power electronics unit, and at least one component of the vehicle.

5. The modular air-conditioning unit according to claim 1, wherein the refrigerant circuit further includes a chiller.

6. The modular air-conditioning unit according to claim 1, wherein the evaporator air flow path and the condenser air flow path at least partially merge together in the housing.

7. The modular air-conditioning unit according to claim 1, wherein the first adjustment flap, the second adjustment flap, and the third adjustment flap each include an axis of rotation disposed between the inlet to the common waste air duct and the inlet to the passenger compartment of the vehicle.

8. The modular air-conditioning unit according to claim 1, wherein the first adjustment flap is adjustable to a closed position blocking the flow of air through the evaporator from entering the common waste air duct and the second adjustment flap is adjustable to a closed position blocking the flow of air through the condenser from entering the common waste air duct, wherein the flow of air through the evaporator and the flow of air through the condenser each bypasses the common waste air duct when both of the first adjustment flap and the second adjustment flap are each respectively in the closed position.

9. The modular air-conditioning unit according to claim 1, wherein the first adjustment flap, the second adjustment flap, and a third adjustment flap are each disposed downstream of the evaporator along the evaporator air flow path and downstream of the condenser along the condenser air flow path.

10. The modular air-conditioning unit according to claim 1, wherein the common waste air duct extends in a direction perpendicular to each of the flow of air through the evaporator and the flow of air through the condenser.

11. A modular vehicle air-conditioning unit for heating and cooling air, comprising:

a refrigerant circuit including a condenser, an evaporator, a compressor, and an expansion device; and a housing including the evaporator and the condenser disposed in the housing, an evaporator air flow path through the evaporator and a condenser air flow path through the condenser independently formed from each other within the housing, and a mixing compartment disposed downstream of the evaporator and the condenser wherein a flow of air through the evaporator and a flow of air through the condenser are mixed, wherein a common waste air duct for waste air flow through the evaporator and waste air flow through the condenser is disposed between the evaporator and the condenser and upstream of the mixing compartment; wherein the evaporator air flow path and the condenser air flow path respectively receive air from at least one of an environment, a passenger compartment of a vehicle, and any mixture thereof, wherein a first adjustment flap is disposed between the evaporator and an inlet of the common waste air duct, a second adjustment flap is disposed between the condenser and the inlet of the common waste air duct, and a third adjustment flap is disposed within the housing between the inlet to the common waste air duct and an inlet to the passenger compartment of the vehicle, wherein the first adjustment flap, the second adjustment flap, and the third adjustment flap are independently rotatable about a common axis of rotation, and wherein the flow of air through of the evaporator air flow path and the condenser air flow path is selectively controlled to facilitate at least one of a heating and a cooling of the passenger compartment of the vehicle, and wherein the waste air duct releases a flow of waste air to an environment separate from the passenger compartment.

\* \* \* \* \*